(12) United States Patent
Schunk et al.

(10) Patent No.: US 9,698,678 B2
(45) Date of Patent: Jul. 4, 2017

(54) CIRCUITRY AND METHOD FOR REGULATING A CURRENT FOR DIAGNOSING AN ELECTROMECHANICAL LOAD UTILIZING MULTIPLE CURRENT MEASUREMENTS

(71) Applicant: ZF Friedrichshafen AG, Friedrichshafen (DE)

(72) Inventors: Matthias Schunk, Auerbach (DE); Matthias Gnan, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/891,246

(22) PCT Filed: Apr. 14, 2014

(86) PCT No.: PCT/EP2014/057459
§ 371 (c)(1),
(2) Date: Jan. 22, 2016

(87) PCT Pub. No.: WO2014/183937
PCT Pub. Date: Nov. 20, 2014

(65) Prior Publication Data
US 2016/0172971 A1 Jun. 16, 2016

(30) Foreign Application Priority Data
May 15, 2013 (DE) .......................... 10 2013 208 982

(51) Int. Cl.
*H02M 3/156* (2006.01)
*H02M 3/155* (2006.01)
(Continued)

(52) U.S. Cl.
CPC .......... *H02M 3/155* (2013.01); *H01F 7/1805* (2013.01); *H01F 7/1844* (2013.01); *H02M 2001/0009* (2013.01)

(58) Field of Classification Search
CPC ... H02M 2001/009; H02M 1/32; H02M 3/156
See application file for complete search history.

(56) References Cited

U.S. PATENT DOCUMENTS 3,959,753 A * 5/1976 Wafer .................... H01H 79/00
335/147
2005/0194998 A1 9/2005 Watanabe
(Continued)

FOREIGN PATENT DOCUMENTS

DE 4109233 A1 9/1992
DE 19611522 A1 9/1997
(Continued)

OTHER PUBLICATIONS

International Search Report issued Jul. 31, 2014 in International Application No. PCT/EP2014/057459 (3 pages)(English Translation).
(Continued)

*Primary Examiner* — Harry Behm
*Assistant Examiner* — Peter Novak
(74) *Attorney, Agent, or Firm* — Brinks Gilson & Lione

(57) ABSTRACT

A circuitry for regulating a current for an electromechanical load comprises a first connection and a second connection for the electromechanical load. The first connection can be coupled to a first supply potential thereby, and a potential of the second connection can be modified by means of a pulse width modulation. The circuitry also comprises a measurement assembly having a first measurement signal input, which is coupled to the first connection and a second measurement signal input, which is coupled to the second
(Continued)

Figure 1:
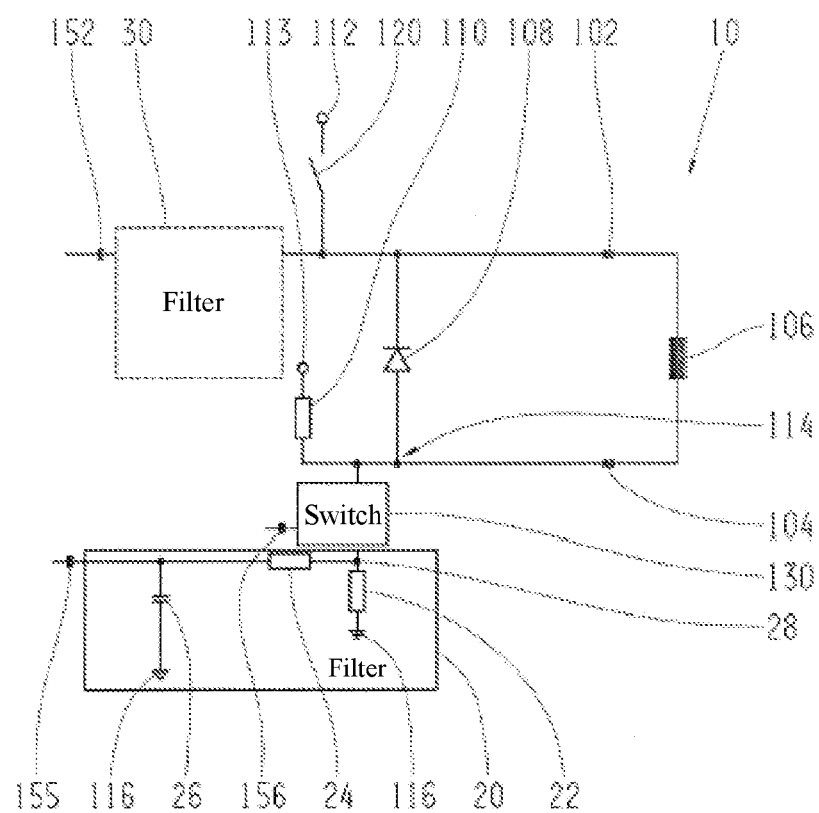

connection. The measurement assembly is designed thereby to determine a measurement signal that is proportional to a potential difference between the first and second connection, in order to regulate the current for the electromechanical load on the basis of the measurement signal.

10 Claims, 12 Drawing Sheets

(51) Int. Cl.
  *H01F 7/18* (2006.01)
  *H02M 1/00* (2006.01)

(56) References Cited

U.S. PATENT DOCUMENTS

| | | | |
|---|---|---|---|
| 2006/0017389 A1* | 1/2006 | Noh | H05B 41/3921 315/112 |
| 2008/0231247 A1 | 9/2008 | Uehara | |
| 2009/0121801 A1* | 5/2009 | Cheng | H03K 19/00315 332/109 |
| 2009/0164165 A1* | 6/2009 | Homer | G11C 7/02 702/107 |
| 2010/0033146 A1 | 2/2010 | Irissou | |
| 2010/0176759 A1 | 7/2010 | North | |
| 2011/0094589 A1 | 4/2011 | Jacob | |
| 2011/0199060 A1 | 8/2011 | Sriram | |

FOREIGN PATENT DOCUMENTS

| | | |
|---|---|---|
| DE | 10062190 C1 | 2/2002 |
| DE | 102005012752 A1 | 9/2006 |
| DE | 102007032178 B3 | 12/2008 |
| DE | 102009027340 A1 | 1/2011 |
| WO | WO 2009/105415 A1 | 8/2009 |

OTHER PUBLICATIONS

International Search Report issued Jul. 31, 2014 in International Application No. PCT/EP2014/057459 (12 pages)(German Language).

Office Action from corresponding DE 10 2013 208 982.1, dated Jan. 13, 2014 (7 pages)(including English translation of p. 5).

* cited by examiner

CIRCUITRY AND METHOD FOR REGULATING A CURRENT FOR DIAGNOSING AN ELECTROMECHANICAL LOAD UTILIZING MULTIPLE CURRENT MEASUREMENTS

This application is a filing under 35 U.S.C. §371 of International Patent Application PCT/EP2014/057459, filed Apr. 14, 2014, and claims the priority of DE 10 2013 208 982.1, filed May 15, 2013. These applications are incorporated by reference herein in their entirety.

The present disclosure pertains to the field of diagnosis of electrical loads, and relates in particular to a circuitry and a method for regulating a current for an electromechanical load, or an electrically activated actuator or actuating component.

Electrically activated actuators, basically in the form of magnetic valves or coils, are used in many fields of technology, for activating hydraulic regulator control elements in clutches and transmissions of motor vehicles, for example. In general, actuators serve to convert electrical signals into mechanical movement or other physical parameters (e.g. pressure or temperature) and can thus be regarded as electromechanical regulator control elements for control circuits, for example. Ongoing tests can be carried out thereby, in order to ensure the functionality of the electromechanical actuator and thus the control circuit. These tests can comprise, in particular, measurements of present current values and comparisons of the current value with known current values. Significant deviations of the values to one another indicate a malfunction. The patent application DE 101 34 745 A1 shows a method and a device for checking, in particular, low impedance magnetic coils for short circuits.

Furthermore, a control or regulation of the electrical current by the actuator may be desired in order to prevent the occurrence of power fluctuations. The patent application DE 43 29 917 A1 discloses a circuitry assembly for a clocked power supply to an electromechanical load.

The measurement of the current includes, in general, the use of a measurement shunt, which is usually connected in series with the electromechanical load, e.g. a valve. A shunt is a low impedance electrical resistor, which is used to measure the electrical current. The current flowing through a shunt causes a voltage drop in proportion to the shunt, which voltage drop is measured. For measuring higher currents, shunts have a robust mechanical construction. Materials for the resistors are Manganin, Constantan, Isotan, and Isabellin. The aim is to obtain the lowest possible temperature coefficient for the specific electrical resistance. The use of a shunt, however, results in increased costs for a circuitry of this type; furthermore, the shunt requires further resources such as, e.g., space and additional controller pins. Furthermore, with the diagnosis of a malfunction in an electromechanical load, it is not possible to decisively distinguish between normal operation of the load and a short circuit to the ground, (short circuit to ground, SCG) of up to 50Ω during operation.

For this reason, there is a need for an improved concept for regulating a current for an electromechanical load, such as an electrically activated actuator, for example.

These needs are fulfilled by a circuitry and a method having the features of the independent claims. Further advantageous embodiments and further developments are the subject matter of the dependent claims.

According to a first aspect, exemplary embodiments of the present disclosure provide a circuitry for regulating an (electrical) current for an electromechanical load, or an electrically activated actuator, respectively. The circuitry comprises a first connection and a second connection for the electromechanical load, wherein the first connection can be coupled to a first (electrical) supply potential, and wherein a potential of the second connection can be modified by means of a pulse width modulation, or pulse breadth modulation (PMW). Furthermore, the circuitry comprises a measurement assembly having a first measurement signal input coupled to the first connection, and a second measurement signal input coupled to the second connection. The measurement assembly is designed thereby to transmit a measurement signal proportional to a potential difference between the first and second connection, in order to regulate the current for the electromechanical load, such as, e.g., an electrically activated actuator, on the basis of the measurement signal.

In other words, an electromechanical load can be incorporated in an electrical circuit between the two connections, wherein the voltage decreasing over the load can be measured—in a manner similar to that with a shunt/resistor—via the two connections, and based on this, the current through the load can be regulated accordingly. In exemplary embodiments, the electromechanical load can be an electrically activated electromechanical actuator. The term "actuator" has the same meaning herein as an actuating component, a control element, a control means, etc. As a rule, these terms can indicate a mechanism for converting electrical current into movement, such as a servomotor, for example.

An electrical potential is to be understood to mean a voltage that is measured starting at a predefined reference point (e.g. "ground"). Accordingly, supply potential can be understood to mean, e.g., a supply voltage, such as a battery voltage, for example, in particular a battery DC voltage. By modifying the potential at the second connection (by means of PWM), the voltage (U) decreasing over the electromechanical load, and thus over the equation I=U/R, as well as the electrical current (I) flowing through the electromechanical load, can be regulated, or controlled, respectively.

Parts of the circuitry can be coupled to one another via one or more electrically conductive connections. If two parts of the circuitry can be coupled to one another, then an electrically conductive connection can be established, using a switch for example, between the circuitry part. A switch can be controlled electrically, via a microcontroller for example, which can also comprise the measurement assembly, for example, but mechanical switch designs are also possible. Likewise conceivable are designs in which the switch can be activated via an optical signal. Instead of a micro controller, any other processor having peripheral functions can be used. The microcontroller and processor are specified here merely as examples for a measurement assembly. A PWM is frequently used for data transfer; in particular, energy conversion in a technical system can be controlled by means of a PWM. With digital circuitries, e.g. processors, which can only process digital signals, analog devices, e.g. motors, can be controlled in this manner. The PWM is a type of modulation in which a technical parameter (e.g. electrical current, electrical voltage) switches between two values. In doing so, with a constant frequency of the duty cycle, a rectangular pulse is modulated, thus the width of the pulse forming it.

Because the current flowing through the electromechanical load is obtained in exemplary embodiments from a voltage measurement between its two connections, the additional incorporation of a shunt designed for this purpose is no longer necessary. According to exemplary embodiments, the electromechanical load itself can be used as a shunt. The circuitry on the whole can thus be manufactured such that it takes up less space and the costs thereof are reduced. By using a measurement assembly, and switches that can be activated by it, a type of feedback loop can be generated, by means of which interfering deviations from normal operation can be compensated for, and an improved concept for diagnosis of malfunctions can be created.

According to another aspect, exemplary embodiments also provide a method for regulating a current for an electromechanical load. The method comprises a step thereby in which a first connection for the electronic load is coupled to a first supply potential, and a potential of a second connection for the electromechanical load is modified by means of a PWM. Furthermore, the method comprises a step for determining a measurement signal that is proportional to a potential difference between the first and second connection by means of a measurement assembly having a first measurement signal input coupled to the first connection, and having a second measurement signal input coupled to the second connection. The current through the electromechanical load is regulated or controlled on the basis of the measurement signal.

By way of example, exemplary embodiments may be used in motor vehicles for controlling or regulating actuators. That is, according to a further aspect, a vehicle having a circuitry for regulating a current for an electromechanical load, or an electrically activated actuator, respectively, is also provided.

Figure 2:
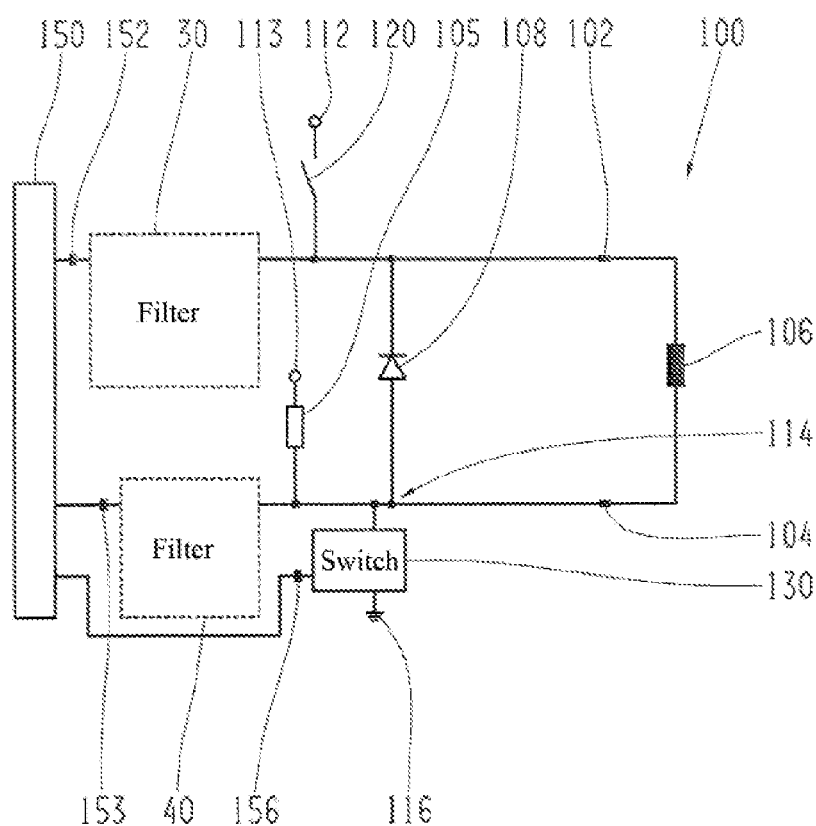
Figure 3:
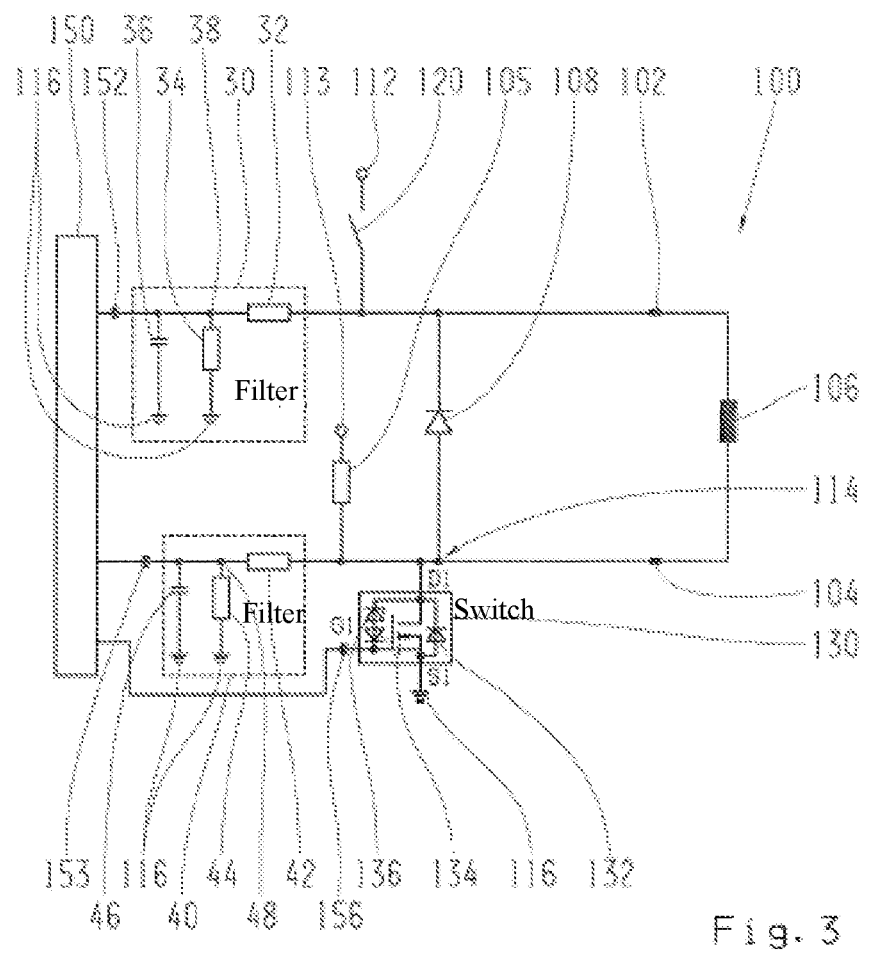
Figure 4:
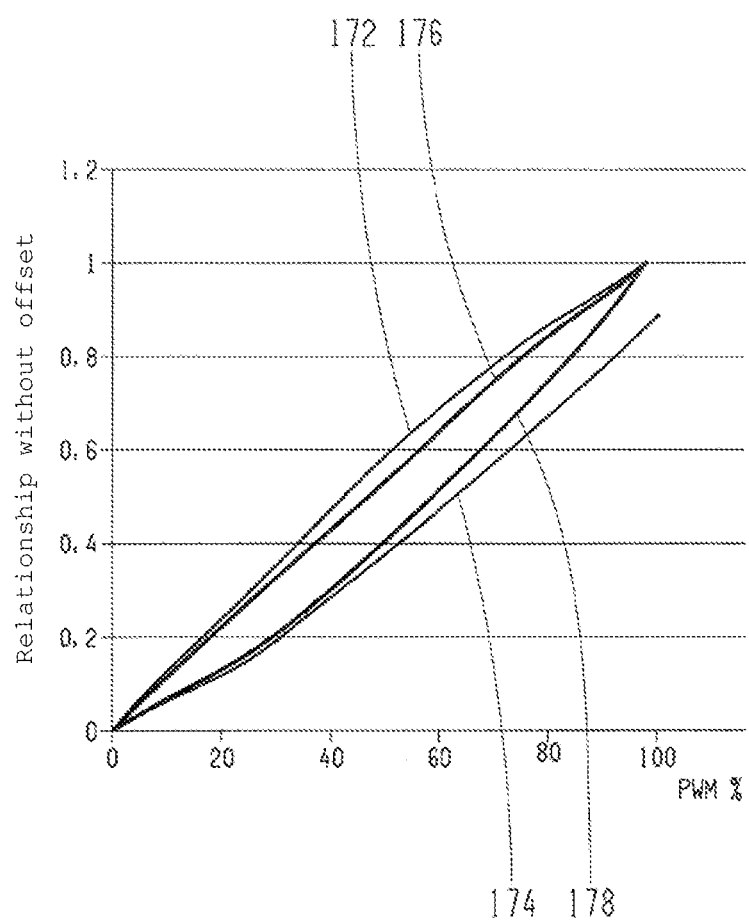
Figure 5:
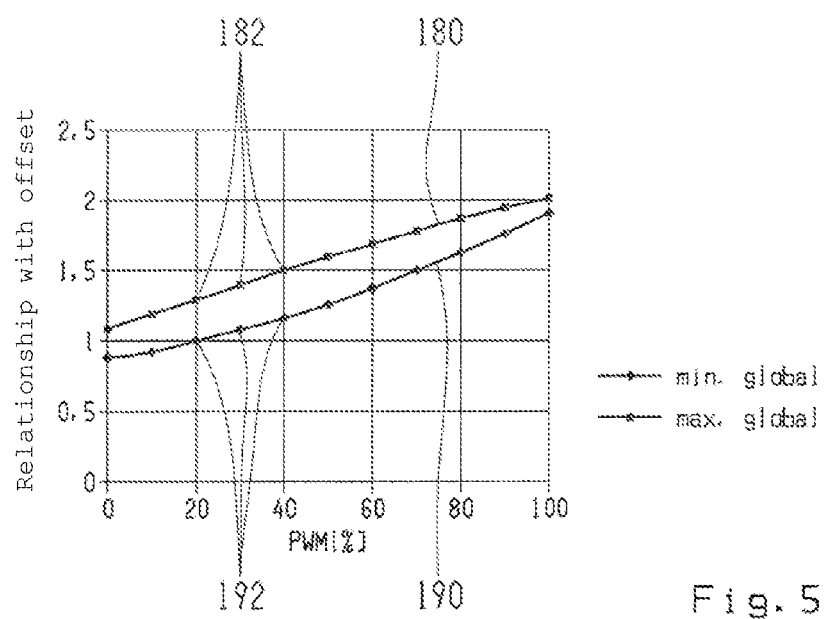
Figure 6:
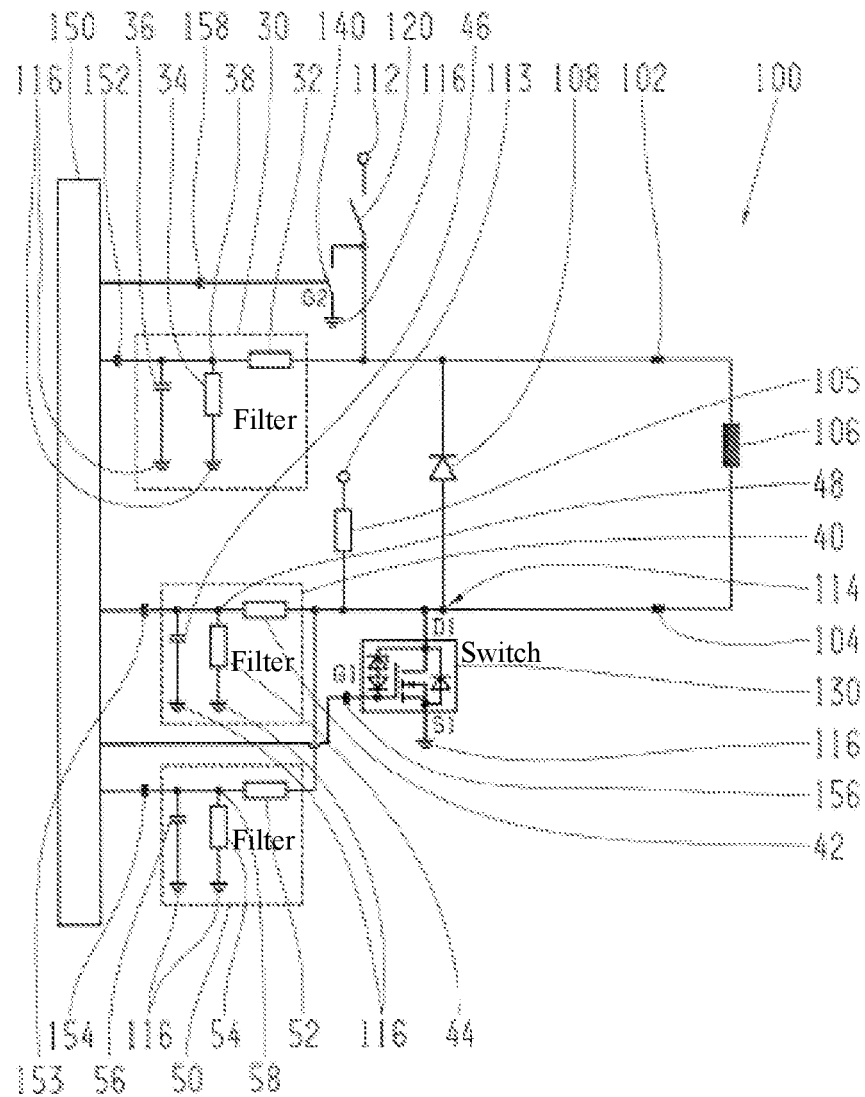
Figure 7:
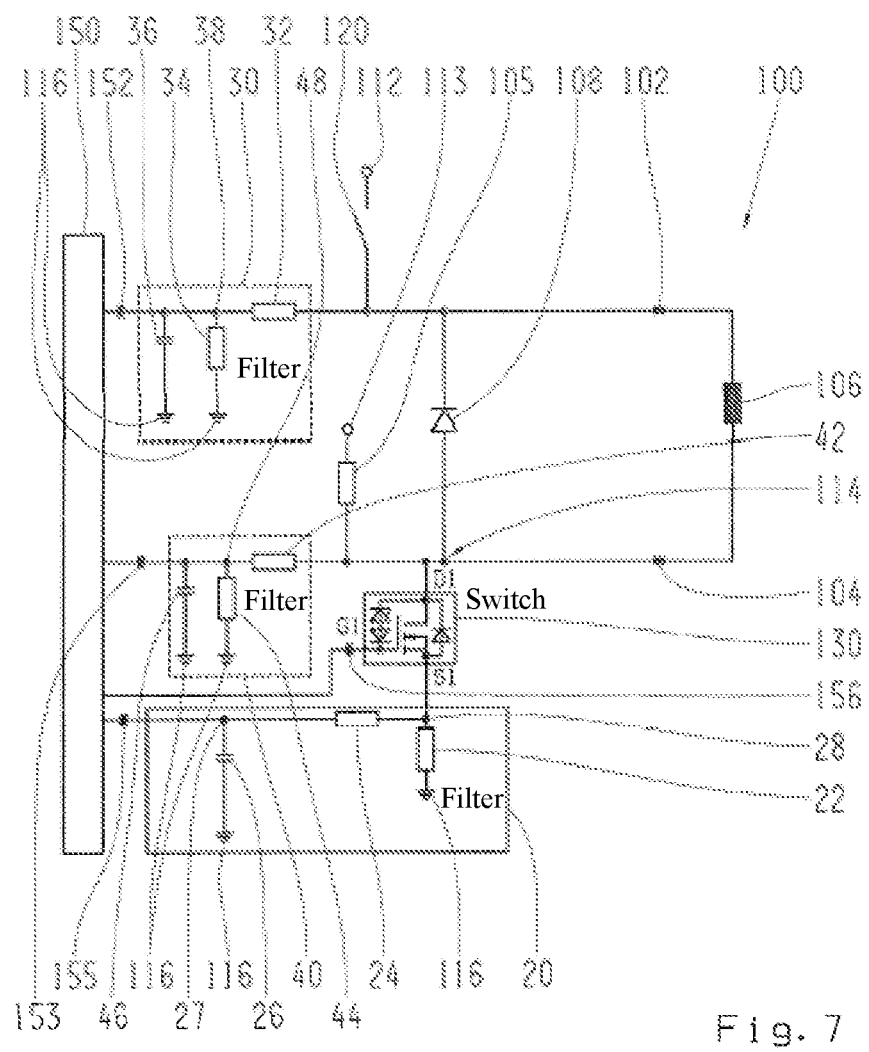
Figure 8:
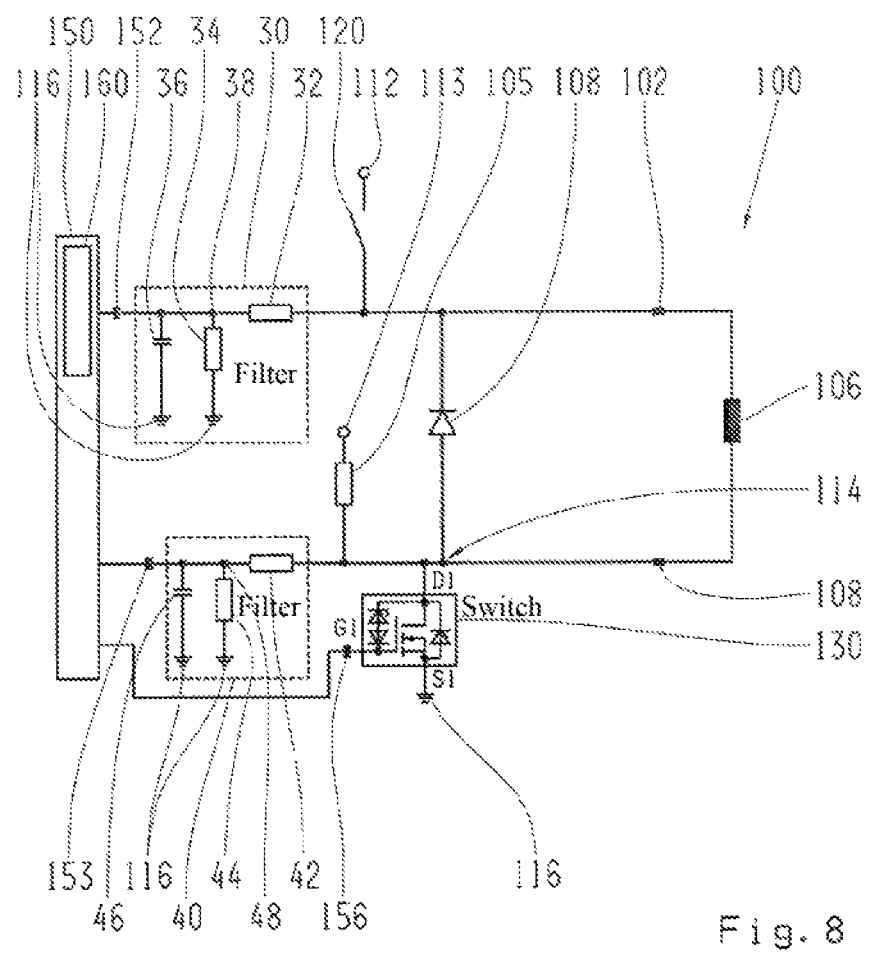
Figure 9:
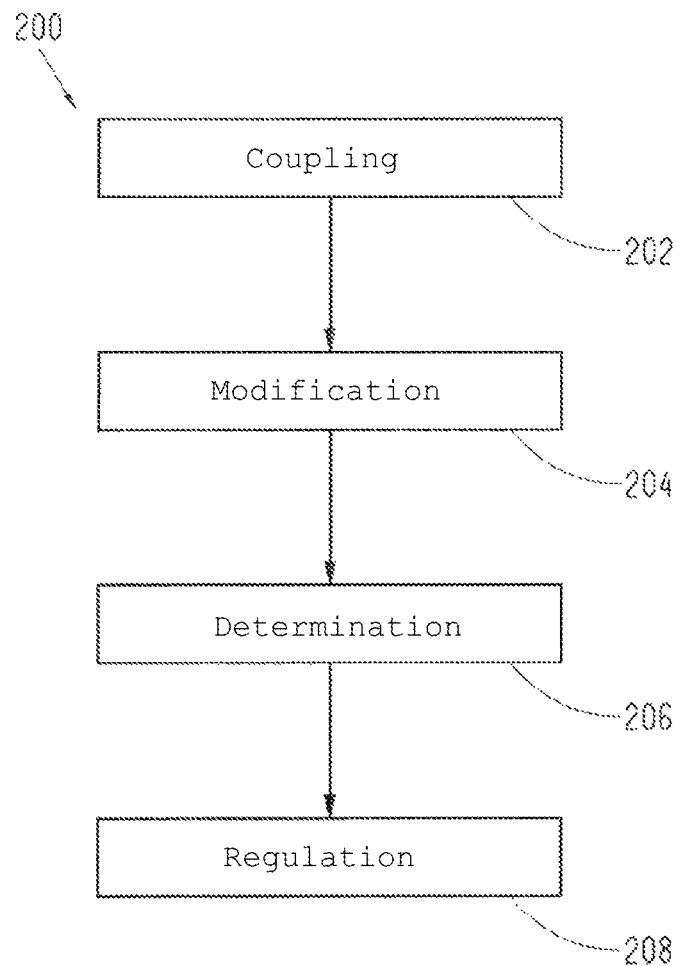
Figure 10:
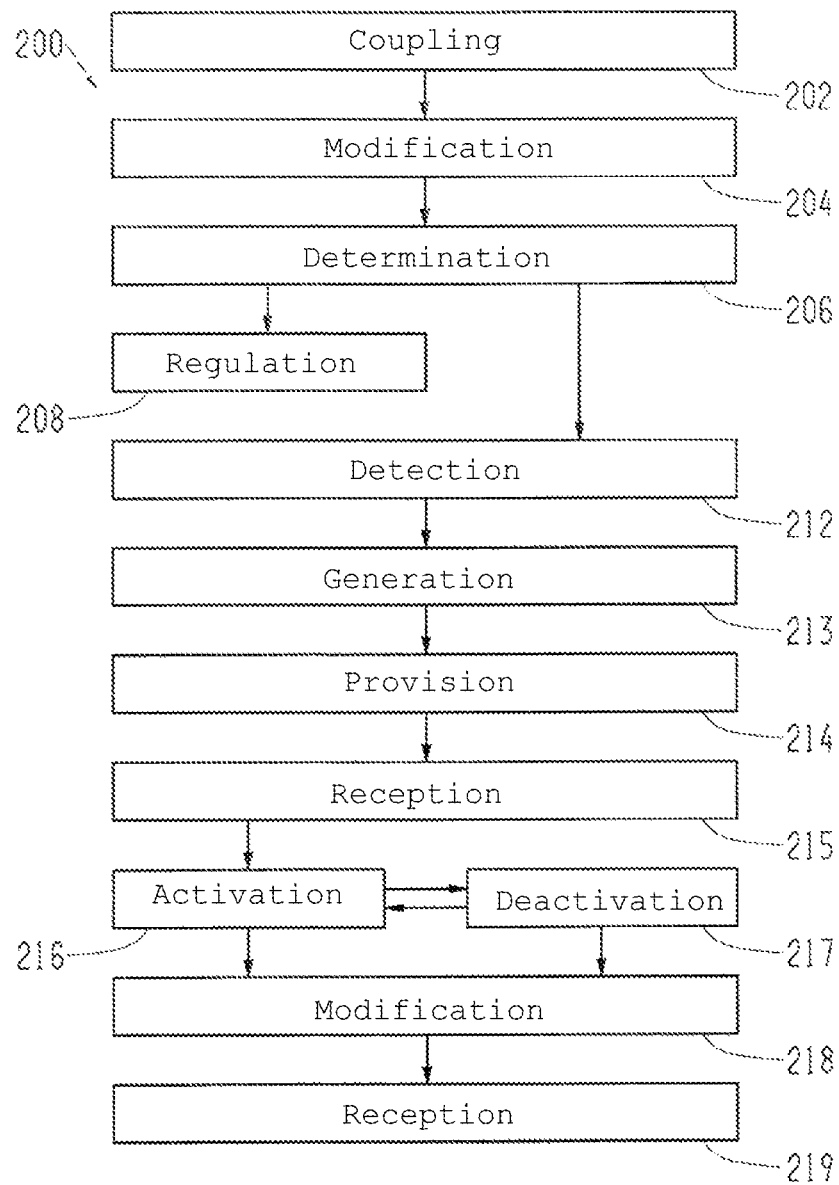
Figure 11:
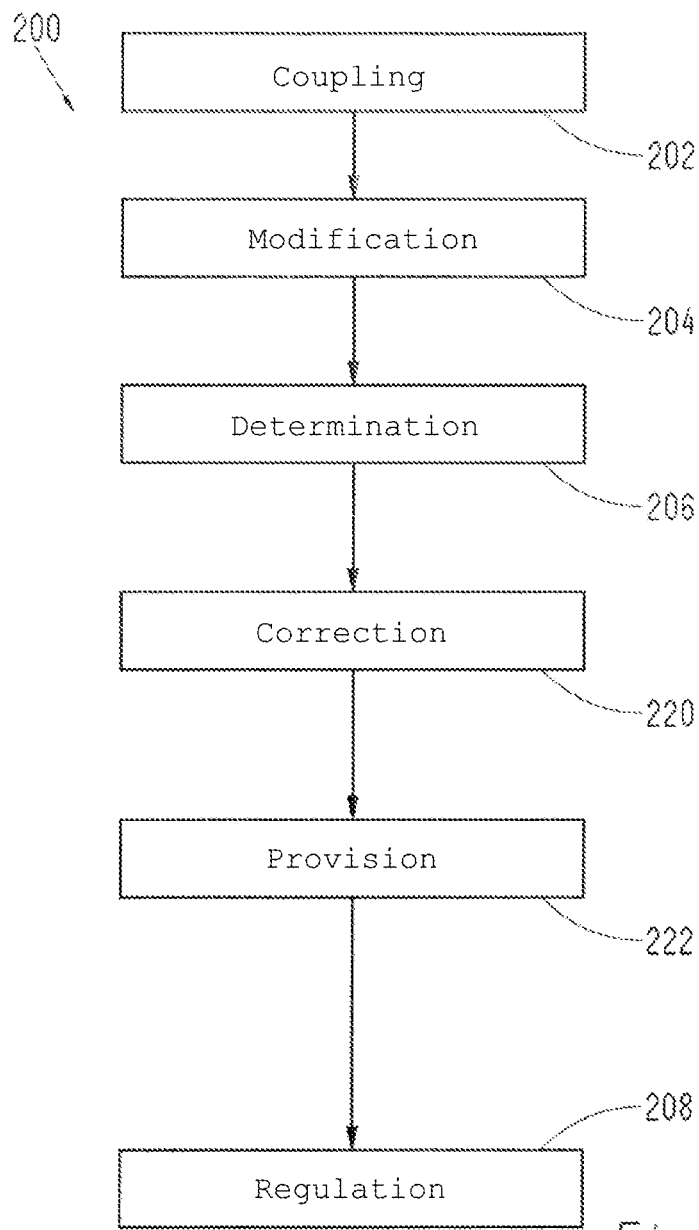
Figure 12:
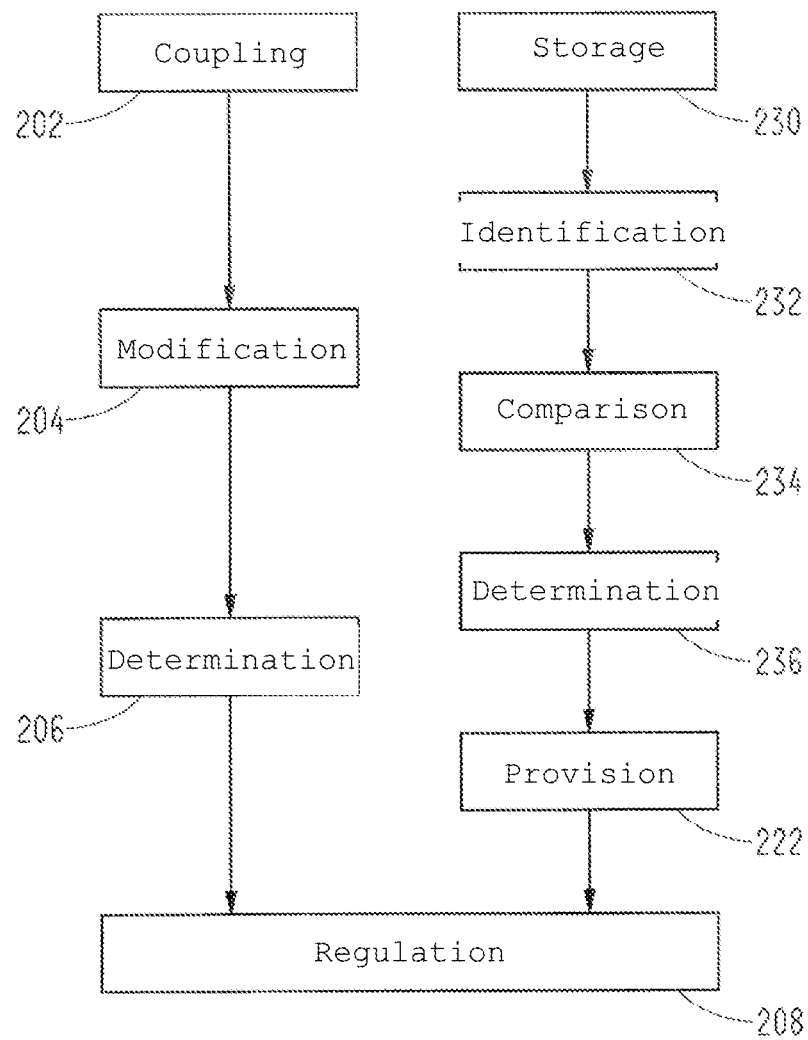

Some exemplary embodiments of the present invention shall be explained in greater detail below, with reference to the attached figures. Therein:

FIG. 1: shows a comparison example of a conventional circuitry for regulating a current for an electromechanical load;

FIG. 2: shows a first exemplary embodiment of a circuitry having an improved concept for regulating a current for an electromechanical load;

FIG. 3: shows a detailed exemplary embodiment of the circuitry from FIG. 2;

FIGS. 4 and 5: show calculations of a current through an electromechanical load with increased precision, recorded in a diagram against the PWM;

FIG. 6: shows an exemplary embodiment of a circuitry for regulating a current for an electromechanical load having an improved concept for malfunction diagnosis;

FIG. 7: shows an exemplary embodiment for a circuitry for regulating a current for an electromechanical load, which enables a particularly comprehensive malfunction diagnosis;

FIG. 8: shows an exemplary embodiment for a circuitry for regulating a current for an electromechanical load, which enables an extremely precise malfunction diagnosis;

FIG. 9: shows a flow chart of a method for regulating a current for an electromechanical load, using the circuitry from FIG. 3;

FIG. 10: shows an expanded flow chart of a method for regulating a current for an electromechanical load, using the circuitry from FIG. 6;

FIG. 11: shows an expanded flow chart of a method for regulating a current for an electromechanical load, using the circuitry from FIG. 7; and FIG. 12: shows an expanded flow chart of a method for regulating a current for an electromechanical load, using the circuitry from FIG. 8.

Various exemplary embodiments shall now be described with reference to the attached figures, in which a few exemplary embodiment examples are depicted. In the figures, the thicknesses of lines, layers and/or regions may be exaggerated for the sake of clarity.

In the following description of the attached figures, which show only a few exemplary embodiment examples, identical reference symbols can refer to identical or comparable components. Furthermore, collective reference symbols may be used for components and objects that have multiple appearances in an exemplary embodiment or in a drawing, but which can be described collectively with regard to one or more features. Components or objects that are described with identical or collective reference symbols may be executed identically, but also differently, if applicable, with respect to individual, numerous or all features, such as their dimensions for example, as long as the description does not result, implicitly or explicitly, in something else.

Although exemplary embodiments may be modified or altered in different ways, exemplary embodiments are depicted in the figures as examples, and shall be described in detail herein. It is, however, clear that it is not the intention to limit exemplary embodiments to the respective disclosed forms, but rather, that exemplary embodiments should cover all functional and/or structural modifications, equivalents and alternatives lying within the scope of the invention. Identical reference symbols indicate identical or similar elements in the entirety of the description of the figures.

It is clear that an element that is described as being "connected" or "coupled" to another element may be connected or coupled directly to the other element, or that intermediate elements may be present. If, however, an element is described as being "directly connected" or "directly coupled" to another element, there are no intermediate elements. Other terms that are used to describe the relationship between elements should be interpreted in a similar manner (e.g. "between," as opposed to "directly between," "adjacent" as opposed to "directly adjacent" etc.).

The terminology used herein is used only to describe specific exemplary embodiments, and should not limit the exemplary embodiments. As used herein, the singular forms of the indefinite and definite articles should also refer the plural forms, as long as the context does not indicate something else. Furthermore, it is clear that the expressions such as "contained," "containing," "have," and/or "having," as used herein, indicates the presence of specified features, whole numbers, steps, process sequences, elements and/or components, but the presence or addition of a, or one or more, feature(s), whole number(s), step(s), process sequence (s), element(s), component(s) and/or group(s) is not excluded therefrom.

As long as nothing else is specified, all of the terms used herein (including technical and scientific terms) have the same meaning that would be applied to them by a typical person skilled in the art in the field to which the exemplary embodiments belong. Furthermore, it is clear that expressions, e.g. those defined in dictionaries in common use, are to be interpreted as though they have the same meaning that is consistent with their meaning in the context of the relevant technology, and are not to be interpreted in an idealized or excessively formal sense, as long as this is not expressly indicated herein.

For the regulation of electronic loads, such as, e.g., valves/actuators/electromagnets, the current through the load is frequently determined by means of an additional shunt. Likewise, electromechanical loads can be designed such that they are "voltage controlled," wherein the regulation of the load current can occur via a PWM, in relation to the supply voltage of the load. The PWM can lie between 0% and 100%. In this range, a malfunction diagnosis can occur, i.e. the detection of a "short circuit battery" and/or a "valve shearing" for example. Distinctions between various possible malfunctions are important, in order to respond appropriately to a malfunction, and to simplify the search for the malfunction for technicians working on the problem. Likewise, particularly with applications that are critical with regard to safety, the malfunctions may have different consequences or result in critical/non-critical states. Particularly the malfunction "short circuit to ground" (GND) can result in a critical state, because the electromechanical load (such as a valve or a coil) is supplied with current, and can cause an unintentional action. Different methods are known for detecting such malfunctions. One example of this is shown in FIG. 1.

FIG. 1 shows a conventional circuitry 10 for malfunction diagnosis for an electromechanical load 106, which is connected between a first connection 102 and a second connection 104 of the circuitry 100. The first connection 102 is coupled to a first supply potential 112 via a (main) switch 120. The first supply potential 112 can be provided, for example, by a voltage source, in particular a DC voltage source, such as an automobile battery. By way of example, the first supply voltage can be 12V. The first connection 102 is furthermore coupled to a first measurement signal input 152 of a measurement assembly, not explicitly shown in FIG. 1, such as a microcontroller, for example, via a low pass filter circuit 30 (abbr.: low pass). The second connection 104 is coupled to a second supply potential via an electrical resistor 110, which supply potential can be lower than the first supply potential 112, e.g. 5V. As a result, a sufficient voltage drop can be obtained via the connections, or clamps 102, 104. Furthermore, the second connection is connected to a first connection 28 of a shunt 22 via a first (PWM) switch 130, the second connection of which lies on a reference potential 116, such as the electrical ground, for example. The voltage measured at the connection, or node 28, can be supplied to another measurement signal input 155 of the measurement assembly via a low pass 20, in order to be able to draw conclusions regarding the current passing through the load 106. The current through the load 106 can be regulated or controlled by means of a control connection 156 of the measurement assembly that controls the switch 130. For this, a (digital) pulse width modulated control signal (PMW signal) is supplied to the switch 130 via the control connection 156, which switches the potential of the second connection back and forth, accordingly, between a "high" and "low" state. For this, the measurement assembly 150 (FIG. 2) can have a PWM module, for example. For safety reasons, a flyback diode 108 is also connected between the connections 102 and 104, in parallel to the electromechanical load 106. Flyback diodes are generally used for protection against a voltage surge, which can occur, for example, when switching off an inductive load 106.

In accordance with FIG. 1, an electromechanical load 106, e.g. a valve, is thus connected to the supply potential 112, or an extra supply for actuators that can be switched on and off by means of the main switch 120, e.g. a semiconductor switch, respectively, via the first connection 102, e.g. a connector pin. The measurement of the supply voltage 112 to the valve 106 occurs via resistive and capacitive elements of the low pass filter circuit 30. The PWM is then adjusted, accordingly, to the supply voltage 112. The valve 106 is clocked on the side encompassing the second connection 104 via the first switch 130, which is a metal oxide semiconductor field effect transistor (MOSFET), by way of example.

The circuitry part 20 should enable a diagnosis: the voltage drop is measured via the shunt 22 with the analog/digital (AD) measurement signal input 155 via a resistor/capacitor (RC) link. In relation to the PWM set through the first switch (e.g. MOSFET) 130, through a first control signal output 156, one expects a corresponding current through the shunt 22. If the current is too high (and thus the voltage as well), there is probably a short circuit to the battery at the second connection 104. If the measured current is too low, the connection 104 may have a short circuit to the reference potential (general ground) 116, or the load is sheared off. High impedance short circuits (up to 50 ohm, for example) cannot be detected during operation with this evaluation. A distinction between an open load and a short circuit to ground (SCG), cannot be detected with the circuitry according to FIG. 1, particularly when it is assumed that the short circuit to ground may comprise multiple 10 ohms. In theory, however, an additional resistive element, or electrical resistor 110, respectively, may be provided. This must be a relatively high impedance resistor, because otherwise too much current in the voltage source 114, e.g. internally generated 5 volts, would be returned. The advantage of this circuit is that shunts can be detected via the electromechanical load (the valve) 106, e.g. short circuits of the two valves. This method is used, for example, in the patent application DE 4329917A1, and in the patent application DE 101 34 745A, wherein the shunt would be attached between the second connection and the drain of the MOSFET. If the voltage is to be measured here via the shunt, then two controller inputs, or additional components (hardware, HW) are needed. If one considers that a shunt, as well as the associated evaluation unit, uses numerous resources (cost, space, controller pin assignment, etc.) it is worthwhile to reduce the required resources. A diagnosis that is as comprehensive as possible is required, particularly for outputs that are critical in terms of safety.

As has already been indicated, the costs increase, in particular, due to the additional shunt 22, and the necessary processing of the signals, e.g. by means of operational amplifiers (op-amp; OPV) and the circuitry, in order to be able to keep the resistor, and thus the structure of the shunt as small as possible. Furthermore, a clear distinction between an open load and an SCG during operation is not possible. The aim, therefore, is to enable the same functionality with fewer resources (space, cost, etc.), as well as to find solutions that enable an expansion of the diagnosis taking the resources under consideration.

FIG. 2 shows a first exemplary embodiment of a circuitry 100 for regulating a current for an electromechanical load 106, such as an actuator, for example.

The circuitry 100 comprises a first connection 102 and a second connection 104 for the electromechanical load 106, wherein the first connection 102 can be coupled to a first supply potential 112, and wherein a potential 114 of the second connection 104 can be modified by means of a PWM. Furthermore, the circuitry 100 comprises a measurement assembly 150 having a first measurement signal input 152 coupled to the first connection 102, and having a second measurement signal input 153 coupled to the second connection 104. The measurement assembly 150 is designed thereby to establish a measurement signal that is proportional to a potential difference between the first and second connections 102, 104, in order to regulate or control the current for the electromechanical load 106 based on the measurement signal. A connection of a first switch 130 is coupled to the second connection 104, as is also the case in the circuitry shown in FIG. 1. A second connection of the first switch 130 is coupled, however, directly to the reference potential 116, or "is applied to the ground." The second supply potential 113 is coupled, in turn, to the second connection 104 via the resistive element 105.

In accordance with some exemplary embodiments, the circuitry 100 can be designed, for example, as a control or regulating circuitry for a vehicle, in which the electromechanical load, or actuator 106, respectively, can be incorporated. As has already been stated in the introduction, the electromechanical load, or actuator 106, can be, for example, a valve or an electromagnetic coil, or it can also be a servomotor. The connections 102 and 104 can be designed, for example, as connector pins. The measurement assembly 150 can be preferably designed as a microcontroller, but, fundamentally, this can be any processor having peripheral functions, wherein the peripheral functions can comprise, in particular, various bus systems, such as controller-area-network (CAN), PWM outputs or analog/digital converters. The coupling between the first connection 102 with the supply potential 112 can be obtained in various ways: a main switch 120 used for this can, preferably, be a semiconductor element, such as a transistor, in particular a MOSFET, for example. Aside from switches that can be activated electrically, switches that react to optical signals or that can be operated manually may also be considered. The term "coupling" can be understood in general to mean the creation of an electrically conductive connection. The measurement signals can comprise characteristic values for an electrical current through an actuator 106, such as a voltage at the clamps 102 and 104, an amperage, or changes thereto, for example. In particular, the measurement signals can also comprise a complex series of changes to the physical parameters.

In exemplary embodiments, the first measurement signal input 152 of the measurement assembly 150 can be coupled to the first connection 102 via a first low pass filter circuit 30. Likewise, the second measurement signal input 153 of the measurement assembly 150 can be coupled to the second connection 104 via a second low pass filter circuit 40. The first low pass filter circuit 30 and the second low pass filter circuit 40 are depicted purely schematically in FIG. 2. A low pass filter circuit can be designed as an RC link, which can filter out electrical currents and/or voltages in a defined, particularly high frequency range. Low passes can be incorporated upstream of very sensitive or very expensive measurement assemblies, in order, for example, to damp voltage peaks, which would otherwise be detrimental to the measurement assembly. In particular, the low passes 30 and 40 can also be provided in order to prevent or reduce aliasing effects during an analog/digital conversion (A/D conversion) of the respective (analog) measurement signals. Aliasing effects refer to malfunctions, thereby, that occur when frequency portions appear in a signal that is to be sampled that are higher than the Nyquist frequency (half of the sampling frequency). In other words, the low passes 30 and 40 can thus each be designed to filter frequency portions out of the measurement signals that are higher than the Nyquist frequency.

In exemplary embodiments, the first low pass filter circuit 30 and the second low pass filter circuit 40 may be designed substantially identical to one another. In other words, this can be understood to mean that individual components, or elements of a low pass filter circuit, in particular resistors or capacitors, are likewise present in the same number and in the same arrangement in relation to one another in the other low pass filter circuit(s). Designs that are substantially identical to one another can also mean, furthermore, that in each case two corresponding components have the same (physical) properties, both quantitatively as well as qualitatively, and at the most, differ from one another in the scope of manufacturing tolerances. The identical design of the low passes 30 and 40 can significantly reduce coherence malfunctions and tolerance dependencies: the coherence of two (time) signals refers to their linear relationship over the frequency. If two originally coherent, PWM modulated signals then pass through two differently designed low passes, they can then possibly be modified, as a result, in two different manners, such that they can no longer be detected as coherent by the measurement assembly.

As is visible in FIG. 2, the flyback diode 108 can also be connected in parallel to the actuator 106 between the connections 102 and 106. Flyback diodes are generally used for protection against a voltage surges, which can occur, for example, when an inductive DC load is shut off.

The second supply potential 113, in turn, is connected to the second connection 104 via a resistor 105. The potential 114 of the second connection 104 resulting therefrom serves for a later malfunction diagnosis, among other things. In order to implement the PWM at the second connection 104, a switch 130 can be coupled to the second connection 104, which in this case is designed as a MOSFET, by way of example, and can be activated via a first control signal output 156 of the measurement assembly 150. When the switch 130 is engaged, the potential 114 of the second connection 104 can be aligned with the reference potential 116. The reference potential 116 can also be referred to as the "ground." A connection to the reference potential 116, also referred to as "grounding," can be implemented, for example, by means of a conductive outer paneling or contact with the ground by the circuitry 100. The potential 114 of the second connection 104 can thus change, by means of the PWM, between the ground ("low") and a higher potential ("high"), depending on the second supply potential 113, among other things.

FIG. 3 shows a detailed exemplary embodiment, wherein the first and second low pass filter circuits 30 and 40 can each be formed by resistive elements 32, 34, 42 and 44 and capacitive elements 36 and 46. Resistive elements can generally be understood to mean electrical resistors, at which, when a current is applied, a more or less significant voltage drop occurs. The decreasing voltage is proportional to the ohmic resistance thereby. The resistance value of commercially available fixed resistors can extend over numerous scales of magnitude, from a few milliohms to the giga-ohm range. Aside from fixed resistors, however, parameter dependent resistors (photoresistors, voltage or temperatures dependent resistors) or adjustable resistors may be used. Capacitive elements can generally be referred to as capacitors. Capacitors have at least two electrodes, which can be separated by an insulating region. There may also be a dielectric therein. In exemplary embodiments, the capacitive elements 36 and 46 are formed by fixed capacitors. These can be made from different materials (e.g. ceramic capacitors, plastic film capacitors, etc.) and in various shapes and sizes. Exemplary embodiments also comprise variable capacitors, however, such as trim capacitors (trimmers) or capacitance diodes.

In exemplary embodiments, the first low pass filter circuit 30 can have a first resistive element 32, disposed between the first connection 102 and the first measurement signal input 152, as well as a first parallel circuit formed by a second resistive element 34 and a first capacitive element 36, wherein the first parallel circuit is disposed between the first measurement signal input 152 and the reference potential 116. Analogously, the second low pass filter circuit 40 can have a third resistive element 42, disposed between the second connection 104 and the second measurement signal input 153, as well as a second parallel circuit formed by a fourth resistive element 44 and a second capacitive element 46, wherein the second parallel circuit is disposed between the second measurement signal input 153 and the reference potential 116. In other words, a resistive element 32 or 42 can thus be coupled, respectively, to the first or second connection 102 or 104 and a node 38 or 48 connected to the measurement signal input 152 or 153. Furthermore, in each case, one parallel circuit, comprising a capacitive element 36 or 46 and a resistive element 34 or 44, is connected to the node 38 or 48 connected to the measurement signal input 152 or 153, and to the reference potential. Aside from the exemplary embodiments depicted in FIG. 3 as a so-called passive low pass of the first order, active low passes and/or low passes of higher orders can also be used.

As has already been stated, the PWM can be provided by the first switch 130 disposed between the second connection 104 and the reference potential 116 in exemplary embodiments. This switch 130 can have, for example, a transistor. In the example depicted in FIG. 3, the transistor is designed as a MOSFET, having a sink connection D1, a control connection G1 and a source connection S1. Depending on the design of the transistor, the sink connection D1 is also referred to as a "drain" or "collector," the control connection G1 is also referred to as a "gate" or "basis," and the source connection S1 is also referred to as a "source" or "emitter." More precisely, this is an n-channel MOSFET in the depicted exemplary embodiment. By means of the np transition from the electrode to the substrate, and the pn transition in the return direction to the other electrode, for practical purposes, two diode paths are connected in series, of which, independently of the polarity of the applied voltage, one is always blocked, as is depicted symbolically in the example by a first diode 132. A second diode 134 and a Zener diode 136 protect the gate in the practical application from a voltage surge. Aside from the shown implementation as a filed effect transistor, the first switch 130 can, for example, also be implemented as a bipolar transistor having corresponding peripheral connections.

In the exemplary embodiments, the control connection G1 of the first switch 130 can be coupled to a first control signal output 156 of the measurement assembly 150 that provides a (digital) PWM signal. By way of example, the control connection G1 can be a so-called gate, as long as the first switch 130 comprises a field effect transistor, or a basis connection, as long as the first switch 130 comprises a bipolar transistor.

The circuitry 100 in accordance with FIG. 3 shall be explained more precisely below, by means of a numerical example:

Instead of the shunt 22 and an evaluation unit in accordance with FIG. 1, the circuitry 100 uses an RC filter (low pass 40), which is substantially identical to the low pass 30 that is already used in the measurement of the supply voltage 112 for the load 106, i.e. the capacitive element 36 is substantially identical structurally to the capacitive element 46, the resistive element 32 is substantially identical structurally to the resistive element 42, and the resistive element 34 is substantially identical structurally to the resistive element 44. The substantially identical design of the low passes 30 and 40 is advantageous for reducing coherency errors (see above) and tolerance dependencies. Likewise, the signal arriving at the second measurement signal input 153 is supplied to an analog/digital (A/D) input. The voltage drop can then be determined via the electromechanical load 106 with the electrical potentials 112 and 114 ("above the load" and "below the load"). Thus, in a manner of speaking, the electromechanical load 106 serves as the shunt. Voltage relationships, from the measurement assembly for example, are then calculated by means of the formula (F1):

$$[U\_(152)+U\_(153)]/U\_(152)+1 \quad (F1)$$

Expressed in words, the difference of the voltage recorded at the first measurement signal input 152 and the voltage recorded at the second measurement signal input 153 is divided by the voltage recorded at the first measurement signal input 152, and a constant, having a value of 1, is added thereto. The "+1" serves as a scaling, in order to prevent the occurrence of negative values. Thus, simple data types can be expected in the measurement assembly 150, keeping the necessary computing time in the measurement assembly to a minimum. Normally it is sufficient, for a simulation of the shunt, to compute [U_(first connection)−× U_(second connection)]. It has been found, however, that, for illustrative purposes, a greater precision can be obtained through the division. FIG. 4 serves as proof thereof (here without the offsetting of the "+1"; x-axis: adjusted PWM, y-axis: formula value):

The two outer curves 172 and 174 correspond to a course without division by the value of the voltage recorded at the first measurement signal input 152 (see formula (F1)), and the two inner curves 176 and 178 correspond to a course obtained with the division. With this perspective, a more realistic ripple current ("ripple"), thus an overlapping alternating current from a voltage difference between positive and negative peaks, is superimposed on the battery voltage providing the supply potential 112. In other words, the supply potential 112 in this example does not correspond to a constant voltage, but rather, it fluctuates to a certain extent from one volt. The reason for the difference is that a possible ripple in the battery voltage is nearly entirely reduced therefrom by this division.

A further point is that, with this evaluation there is a resistance to battery voltage fluctuations (for example, resulting from the state or age of the battery). In the present exemplary embodiment, 12V and 24V systems (battery fluctuations between 9 volts and 17 volts) can thus be used in "normal operation" as a rule. The evaluation functions because of the quotient generation, even for lower and higher voltages.

A software for this evaluation that is available to the measurement assembly, or the microcontroller 150, respectively, uses, for example, eleven (although this could be more or fewer, depending on the application) points of support 182 and 192, wherein there is a minimum 192 and a maximum 182 for each point of support. Thus, a "band" spans each of the points of support 182 and 192 that represents the PWM, as can be seen in FIG. 5. The band is delimited by the upper curve 180 and the lower curve 190. If the PWM lies between the PWM values, the upper and lower limits between two points of support are interpolated in a linear manner.

If the value determined via the formula (F1) lies above the upper curve 180, an SCG error is detected. If the value lies below the lower curve 190, a short circuit to battery error (SCB error) is detected. It is possible to distinguish an SCG from an open load, but only when the loads have a very high impedance (more than 10 ohms). If the loads are only in the low impedance range, the "worse malfunction," i.e. an unintentional activation of the load due to a short circuit to ground, is recorded in an error memory, which is integrated in the measurement assembly 150, or can be assigned thereto (not explicitly depicted). In the current exemplary embodiment, nominal short circuits are obtained with this circuit at a load of 10.5 ohm up to 43 ohms at 0% PWM. With higher impedance in the loads, higher impedance malfunctions can be detected. Furthermore, with higher impedance loads, greater than 100 ohms, a distinction between open loads and short circuits to ground can be made.

In summary, it can be said that the shunt 22 is reproduced by means of the electromechanical load 106. As a matter of course, the necessary levels of precision (depending on the tolerance of the load 106), or whether shunts need to be detected, respectively, must be taken into account. In particular, however, the detection of high impedance short circuits to ground, which are regarded as very critical, because a clutch is unintentionally engaged in transmission control devices thereby, for example, can be readily achieved by means of this evaluation. By way of example, resistors, valves, electromagnets, relay, etc. can be used as loads, or consumers 106.

If an open load is to be detected despite a low impedance load 106, the circuitry 100 can be expanded further. FIG. 6 shows an exemplary embodiment for a variation of the circuitry 100, by means of which a further improved concept is created for the diagnosis of malfunctions. In a few exemplary embodiments a second switch 140 that can be activated by a malfunction signal is disposed between the first connection 102, or the first supply potential 112, respectively, and the reference potential 116. The second switch 140 can be designed thereby to modify the electrical potential 114 of the second connection 104 by means of PWM, or, in other words, to clock it. The malfunction signal can be caused by a large variety of errors, whereupon, depending on the application for the circuitry 100, an immediate, automatic reaction may be of utmost importance.

In exemplary embodiments, the second switch 140 can have a control connection G2 coupled with a second control signal output 158 of the measurement assembly 150 that provides the malfunction signal. The malfunction signal, which can be a pulse width modulated control signal for the switch 140, can be generated by the measurement assembly 150 by detecting a malfunction, such that the second switch 140 can be deactivated or activated through the reception of the malfunction signal by means of its control connection G2. Once again, the same embodiment possibilities as those for the first switch 130 can be considered for the second switch 140. By way of example, various semiconductor elements, field effect transistors or bipolar transistors are specified. A malfunction that occurs can be a short circuit, for example, either between the first connection 102 and the second connection 104, as well as to ground, but it can also be an interruption in the circuit by the load 106. In the event of a short circuit to ground (SCG), the load may still be subjected to a current, which can result in unintentional reactions. These can lead to significant damages to the materials, and depending on the field of application for the circuitry, even to physical damage to persons, which could be prevented by an immediate reaction on the part of the measurement assembly 150.

In exemplary embodiments, the measurement assembly 150 can comprise a third measurement signal input 154 coupled to the second connection 105, and receiving a voltage signal. The voltage signal can include the pulsing of the pulse width modulated potential 114 of the second connection 104 thereby. In other words, the process for detecting a malfunction can thus be described in the following manner:

When the measurement assembly 150 detects a malfunction, first, the first switch 130 can be deactivated, and thus, the contact to the ground 116 can be interrupted. At the same time, the measurement assembly 150 can send a clocking signal to the second switch 140. In the event of a load shearing, the potential 114 can then vary between its maximum value and the reference potential 116 in the pulse defined by the second switch 140. At the third measurement signal input 154 (designed here as a digital input), the same pulse can be then be received in the form of low and high values, and thus an open load malfunction can be detected by the measurement assembly 150. If, on the other hand, a short circuit to ground (SCG) occurs at the first connection 102, the second switch cannot modulate voltage, because there is a permanent coupling to the reference potential 116 at the first connection 102, and the potential 114 remains constant. If the SCG occurs at the second connection, the potential 114 permanently assumes the value of the reference potential. In both cases, the measurement assembly 150 receives either only low values or only high values via the third measurement signal input 154, and as a result, detects the malfunction as an SCG.

In other words, if a malfunction is detected (e.g. SCG), the first switch 130, or MOSFET, respectively, is switched off, or deactivated, and thus the coupling to ground 116 is interrupted. Likewise, the main switch 120 is switched off, or deactivated. The second switch 140 is then pulsed, i.e. deactivated and activated in an alternating manner. If the malfunction is an open load, then the corresponding voltage is pulsed via the resistive element, or resistor 105, between the voltage source 113 and the second connection 104, and via the flyback diode 108, and the adjusted PWM, set at the second switch 140, is detected via the third measurement signal input 154. If there is a short circuit to ground, no PWM will be detected. Thus, the embodiment according to FIG. 6 can distinguish between a short circuit to ground and an open load. A well coordinated resistance relationship between all of the shown resistors should be maintained.

In some exemplary embodiments, the third measurement signal input 154 can be a digital input in the measurement assembly 150. In the case of an open load malfunction at the connections 102 or 104, the third measurement signal input 154 can receive a combination of high and low values, for example, thus a square wave signal that corresponds to the pulsing of the current applied to the connection 104. In the case of an SCG malfunction, either a constant current, or no current at all, is present at the third measurement signal input 154, and thus a constant signal is received. Based on the circuitry variation illustrated in FIG. 6, a malfunction diagnosis can now take place that enables a distinction to be made between a load shearing and a short circuit to ground.

In exemplary embodiments, the third measurement signal input 154 can be coupled to the second connection 104 via a third low pass filter circuit 50. Here as well it is possible to prevent undesired voltage peaks from reaching the third measurement signal input 154 by means of the low pass filter circuit 50. Additionally, or alternatively, aliasing effects can be prevented. In exemplary embodiments, the third low pass filter circuit 50 is formed by resistive elements 52 and 54 and capacitive elements 56. For this, resistors and capacitors of the same type may be used, as those used with the resistive elements 32, 34, 42 and 44, and the capacitive elements 36 and 46 in the first low pass filter circuit 30 and the second low pass filter circuit 40. In exemplary embodiments, the third low pass filter circuit 50 can be designed substantially identical to the first low pass filter circuit 30 and/or the second low pass filter circuit 40. In other words, once again a resistive element 52 is coupled to the second connection 104 and a node 58 connected to the third measurement signal input 154, and a parallel connection composed of a capacitive element 56 and a resistive element 54 is connected to a node 58 connected to the third measurement signal input 154 and to the reference potential 116. In FIG. 6, the three low pass filter circuits 30, 40 and 50 are designed as passive low passes of the first order. In this context, "substantially identical" means that firstly, the same type of low pass is used for all three low pass filter circuits 30, 40 and 50, as well as that the individual components are each in the same configuration to one another, and present in the same quantities, and also that components corresponding to one another only deviate from one another in the framework of manufacturing tolerances.

A further variation of a circuitry for regulating a current for an electrically activated actuator is illustrated in FIG. 7.

In some exemplary embodiments, the measurement assembly 150 can also comprise a fourth measurement signal input 155 that receives a voltage signal. The voltage signal can include data regarding the voltage decreasing at the electrically controllable actuator 106, or the current flowing through it, respectively. In other words, the measurement assembly 150 according to FIG. 7 can execute a further measurement, in order to make the malfunction diagnosis even more comprehensive.

In exemplary embodiments, the fourth measurement signal input 155 can be coupled to a source connection S1 of the first switch 130 via a fourth low pass filter circuit 20. As described above, the source connection S1 can be referred to as a source connection or an emitter connection, for example, depending on the type of transistor. The advantages of the use of a low pass have already been specified.

In exemplary embodiments, the fourth low pass filter circuit 20 can include a resistive element 22 (shunt), disposed between the source connection S1 of the first switch 130 and the reference potential 116 (e.g. ground), designed for measuring a current or voltage drop. In addition, the fourth low pass filter circuit 20 can include a further resistive element 24, disposed between the fourth measurement signal input 155 and a node 28 between the source connection S1 of the first switch 130 and the shunt 22 designed for measuring the current and voltage drop. Furthermore, the fourth low pass filter circuit 20 can include another capacitive element 26, disposed between the reference potential 116 and a node 27 between the further resistive element 24 and the fourth measurement signal input 155. The low pass filter circuit 20 can deviate structurally from the already existing low pass filter circuits 30 or 40 or 50.

The measurement assembly 150 can furthermore be designed to correct the measurement signal proportional to the potential difference between the first connection 102 and the second connection 104 by means of the voltage signal received through the fourth measurement signal input 155. Based on the corrected measurement signal, an improved PWM signal can thus be provided by the measurement assembly 150 at the control input G1 of the first switch 130, such that the current decreasing at the electrically activated actuator 106 can be even better regulated by the first switch 130. In other words, this variation represents a combination of the circuit according to the comparison example shown in FIG. 1 and the circuitry and algorithms for solving the problem, as described in reference to FIG. 3, in order to enable a very comprehensive diagnosis. The main difference between the diagnosis via the shunt 22 and the diagnosis in accordance with FIG. 3 is as follows: with the diagnosis via the shunt 22, short circuits extending beyond the load 106 can be detected. By way of example, a further electrical load can lie parallel to the load 106. A temperature model of the load 106 should be stored therewith, however. This cannot acknowledge the diagnosis according to FIG. 3. However, the circuitry described in FIG. 3 and FIG. 6 can detect short circuits to ground (in particular 0-40 ohm short circuits to ground at the second connection 104).

In the variation with a shunt 22 according to FIG. 1, this would only be possible if the algorithm were much more complicated, as is the case, for example, in FIG. 3 and FIG. 6. By way of example, a temperature model that fits very precisely can be allowed for that which cannot be implemented, or can only be implemented with great difficulty. Furthermore, by way of example, a voltage supply tolerance cannot be accounted for, thus resulting in a higher demand on the computing capacity, and requiring more memory. Additionally, it is probably not possible to detect a constant diagnosis with a fixed PWM of, e.g., 0 to 40 ohms. This would comprise a detection at 0 to 20 ohms, and then again at 30 to 40 ohms, because the normal value lies in 20 to 30 ohm range. For this reason, a combination of the prior art and the circuitry according to FIG. 3 provides a diagnosis that is, in part, simpler, but is also much more comprehensive. In other words, the two diagnoses as such are not superimposable, and only intersect to a certain degree. For functions pertaining to safety, this intersection could also be made feasible, i.e. it can be checked whether the diagnosis results are acceptable, plausible, and comprehensible, or not, because the intersections can be generated from independent diagnosis paths.

In some exemplary embodiments, the measurement assembly 150 can comprise a memory, designed to store a temperature model of the electrically activated actuator 106 for a comparison with an actual actuator temperature. In other words, the temperature model of the load can be incorporated in the software. This leads to an increase in the precision and renders the assembly, comprising a load and control, applicable for more precise demands as well. Data regarding the temperature can provide for conclusions regarding the resistance, which in turn is a function of amperage and voltage, among other things.

FIG. 8 shows another variation of a design for a circuitry 100 for regulating a current for an electromechanical load 106, having a memory 160 comprised in the measurement assembly 150 in addition to the features illustrated in FIG. 3.

In some exemplary embodiments the measurement assembly 150 can be coupled to temperature sensor designed for determining the actual load temperature. The measurement assembly 150 can be designed thereby to determine a comparison value by comparing the actual load temperature with the temperature model of the electrically activated load 106. Based on the comparison value, the PWM signal can then be provided by the measurement assembly 150 at the control input G1 of the first switch 130. In this manner, the decreasing current at the electrically activated load 106 can be regulated by the first switch 130. A temperature sensor can determine a temperature, for example, by means of a change in the resistance, by way of example, with so-called hot or cold conductors, or it can also deliver an electrical signal that can be processed directly, such as an integrated semiconductor temperature sensor. In other words, deviations from the typical operating temperatures that are expected for the load 106 can be registered. If unexpected temperature fluctuations occur, then a very precise malfunction diagnosis can be obtained.

According to exemplary embodiments, a method 200 for regulating a current for an electromechanical load, or an electrically activated actuator 106, respectively, is shown schematically in FIG. 9.

The method 200 comprises, firstly, a coupling 202 of a first connection 102 for the electromechanical load 106 with a first supply potential 112, and a modification 204 of the potential 114 of a second connection 104 for the electromechanical load 106 by means of a PWM. Furthermore, the method 200 comprises a determination 206 of a measurement signal (by means of a measurement assembly 150 having a first measurement signal input 152, coupled to the first connection 102, and second measurement signal input 153, coupled to the second connection 104) that is proportional to a potential difference between the first connection 102 and the second connection 104. Lastly, the method 200 comprises a regulating 208 of the current for or through the electromechanical load 106, based on the measurement signal.

In some exemplary embodiments, the method 200 can also comprise further steps, as is illustrated in FIG. 10. These steps may include a detection 212 of a malfunction by the measurement assembly 150, a generation 213 of a malfunction signal, or pulsing PWM signal, respectively, by the measurement assembly 150, as well as a provision 214 of the pulsing signal through a second control signal output 158 of the measurement assembly 150. Likewise, the method 200 can comprise a reception 215 of the pulsing signal through a control connection G2 of a second switch 140, as well as a repeated activation 216 and deactivation 217 of the second switch 140, as well as a modification 218 of the potential 114 of the second connection 104 resulting therefrom, by means of a pulsing signal through the second switch 140. Lastly, a step for receiving 219 a voltage signal through a third measurement signal input 154 of the measurement assembly 150 can also be comprised in the method 200, wherein the voltage signal includes the pulsing of the pulsed potential 114 of the second connection 104 through the second switch 140.

In numerous exemplary embodiments, the method 200 can include further steps, see FIG. 11. These can be a correction 220 of measurement signal through the measurement assembly 150 that is proportional to a potential difference between the first connection 102 and the second connection 104 by means of voltage signal received through a fourth measurement signal input 155, a provision 222 of a PWM signal through the measurement assembly 150 at a control input G1 of a first switch 130, based on the corrected measurement signal and furthermore, a regulation 208 of the current for the electromechanical load 106 through the first switch 130.

In further exemplary embodiments, the method 200 can also comprise further steps, see FIG. 12. These can be a storing 230 of a temperature model of the electromechanical load 106 by a memory 160, an identification 232 of an actual load or actuator temperature by a temperature sensor, as well as a comparison 234 of the actual load temperature with the temperature model of the electrically activated actuator 106 by the measurement assembly 150. Furthermore, it can also comprise a determination 236 of a comparison value by the measurement assembly 150, a provision 222 of a PWM signal by the measurement assembly 150 at a control input G1 of a first switch 130, based on the comparison value, and a regulating 208 of the current for the electromechanical load 106 through the first switch 130.

The features disclosed in the preceding description, the following claims and the attached figures may be of significance and implemented in their various designs, both individually, as well as in any combination, for the realization of an exemplary embodiment.

Although some aspects are described in conjunction with a device, it is to be understood that these aspects also represent a description of the corresponding method, such that a block or a component of a device can also be understood as a corresponding method step, or as a feature of a method step. Analogously, some aspects that have been described in conjunction with a method step also represent a description of a corresponding block or detail or feature of a corresponding device.

Depending on the specific implementation requirements, exemplary embodiments of the invention can be implemented in the hardware or software. The implementation can be carried out using a digital storage medium, e.g. a floppy disk, a DVD, a Blu-ray disc, a CD, a ROM, a PROM, an EPROM, an EEPROM, or a flash drive, a hard disk, or another magnetic or optical storage device on which electronically readable control signals are stored that can or do function together with a programmable hardware component such that the respective method is executed.

A programmable hardware component can be formed by a processor, a computer processor (CPU), a graphic processor (GPU), a computer, a computer system, an application specific integrated circuit (ASIC), an integrated circuit (IC), a system on chip (SOC), a programmable logic element or a field programmable gate array (FPGA) having a microprocessor.

The digital storage medium can thus be machine-readable or computer-readable. Some exemplary embodiments thus comprise a data carrier having electronically readable control signals, which are capable of interacting with a programmable computer system or a programmable hardware component such that one of the methods described herein is executed. One exemplary embodiment is thus a data carrier (or a digital storage medium, or a computer-readable medium), on which the program for executing a method described herein is recorded.

In general, exemplary embodiments of the present invention can be implemented as a program, a firmware, a computer program, or a computer program product having a programming code, or as data, wherein the program code or the data is/are effective with respect to executing a method when the program runs on a processor or a programmable hardware component. The program code or the data can, for example, also be stored on a machine-readable carrier or data carrier. The program code or the data can exist as, among other things, source code, machine code or byte code, as well as other intermediate codes.

A further exemplary embodiment is also a data stream, a signal sequence or a sequence of signals, which represent(s) the program for executing one of the methods described herein. The data stream, the signal sequence, or the sequence of signals can, for example, be configured such that it/they can be transmitted via a data communication connection, e.g. the internet or another network. Exemplary embodiments are thus also signal sequences that represent data that are suitable for transmission via a network or a data communication connection, wherein the data represent the program.

A program in accordance with an exemplary embodiment can implement one of the methods during its execution, for example, in that it reads out storage locations, or writes therein a datum or data, by means of which, if applicable, switching processes or other processes in transistor structures, in amplifier structures, or in other electrical, optical, magnetic components, or other components functioning according to another functional principle, can be implemented. Accordingly, by reading a storage location, data, values, sensor values or other information can be registered, determined or measured by a program. A program can thus register, determine or measure parameters, values, measurement values and other data by reading one or more storage locations, as well as cause, result in, or execute an action by writing in one or more storage locations, as well as activate other devices, machines and components.

The exemplary embodiments described above represent merely an illustration of the principles of the present invention. It is to be understood that modifications and variations of the assemblies and details described herein will be clear to persons skilled in the art. For this reason, it is intended that the invention be limited solely by the scope of protection of the most relevant claim, and not by the specific details presented herein within the description and the explanation of the exemplary embodiments.

REFERENCE SYMBOLS 20 low pass filter circuit according to the prior art
22 shunt
24 further resistive element
26 further capacitive element
27 node
28 node
30 first low pass filter circuit
32 first resistive element
34 second resistive element
36 first capacitive element
38 node
40 second low pass filter circuit
42 third resistive element
44 fourth resistive element
46 second capacitive element
48 node
50 third low pass filter circuit
52 fifth resistive element
54 sixth resistive element
56 third capacitive element
58 node
100 circuitry
102 first connection
104 second connection
105 resistive element between potential and second connection
106 electromechanical load
108 flyback diode
110 additional resistive element
112 first supply potential
113 second supply potential
114 potential of the second connection
116 reference potential
120 main switch
130 first switch
D1 sink connection (drain/collector)
G1 control connection (gate/basis)
S1 source connection (source/emitter)
132 first diode
134 second diode
136 Zener diode
140 second switch
G2 gate/basis
150 measurement assembly (microcontroller)
152 first measurement signal input
153 second measurement signal input
154 third measurement signal input
155 fourth measurement signal input
156 first control signal output
158 second control signal output
160 memory
172 upper outer curve
174 lower outer curve
176 upper inner curve
178 lower inner curve
180 upper curve over maximal value points of support
182 maximal value points of support
190 lower curve over minimal value points of support
192 minimal value points of support
200 method
202 coupling
204 modification (of a potential)
206 determination (of a measurement signal)
208 regulation
212 detection
213 generation
214 provision (of a pulsed signal)
215 reception (of a pulsed signal)
216 activation
217 deactivation
218 modification (of a potential, by a second switch)
219 reception (of a voltage signal)
220 correction
222 provision (of a PWM signal)
230 storage
232 identification
234 comparison
236 determination (of a comparison value)

The invention claimed is:

1. A circuitry for regulating a current for an electromechanical load comprising:
a first connection and a second connection for an electromechanical load, wherein the first connection can be coupled to a first supply potential and wherein a potential of the second connection can be modified by a pulse width modulation; and
a measurement assembly having a first measurement signal input, which is coupled to the first connection, and a second measurement signal input, which is coupled to the second connection, wherein the measurement assembly is designed to determine a measurement signal that is proportional to a potential difference between the first and the second connection, in order to regulate the current for the electromechanical load on the basis of the measurement signal;
wherein the pulse width modulation is provided by a first switch disposed between the second connection and a reference potential;
wherein a control connection of the first switch is coupled to a pulse width modulation signal providing a first control signal output of the measurement assembly;
wherein a second switch that can be activated by a malfunction signal is disposed between the first connection and the reference potential, wherein the second switch is configured to modify an electrical potential of the second connection via pulse width modulation;
wherein the second switch has a control connection coupled to a second control signal output of the measurement assembly that provides the malfunction signal, wherein the malfunction signal is generated by detection of a malfunction by the measurement assembly, such that the second switch can be activated by reception of the malfunction signal through the control connection;

wherein the measurement assembly further comprises a third measurement signal input coupled to the second connection, which receives a voltage signal, wherein the voltage signal includes the pulsing of the pulse width modulated potential of the second connection;

wherein the measurement assembly further comprises a fourth measurement signal input that receives a voltage signal, wherein the voltage signal includes data regarding the current through the electromechanical load.

2. The circuitry according to claim 1, wherein the first measurement signal input is coupled to the first connection via a first low pass filter circuit, and wherein the second measurement signal input is coupled to the second connection via a second low pass filter circuit.

3. The circuitry according to claim 2, wherein the first and the second low pass filter circuits are designed substantially identical to one another.

4. The circuitry according to claim 1, wherein the third measurement signal input is coupled to the second connection via a third low pass filter circuit.

5. The circuitry according to claim 4, wherein the third low pass filter circuit is designed substantially identical to the first and the second low pass filter circuits.

6. The circuitry according to claim 1, wherein the measurement assembly is configured to correct the measurement signal that is proportional to a potential difference between the first and second connection by way of the voltage signal received by way of the fourth measurement signal input, such that, based on the corrected measurement signal, the pulse width modulation signal through the measurement assembly can be provided at a control input of the first switch, such that decreasing current at the load can be regulated by the first switch.

7. The circuitry according to claim 1, wherein the measurement assembly comprises a memory configured to store a temperature model of the electromechanical load for a comparison with an actual load temperature.

8. The circuitry according to claim 7, wherein the measurement assembly is coupled to a temperature sensor designed for a determination of the actual load temperature, wherein the measurement assembly is designed to determine a comparison value through comparison of the actual load temperature with the temperature model of the electromechanical load, such that, based on the comparison value, the pulse width modulation signal through the measurement assembly can be provided at a control input of the first switch, such that the current for the electromechanical load can be regulated by the first switch.

9. The circuitry according to claim 1, wherein the voltage signal includes data regarding the voltage decreasing at the electromechanical load.

10. The circuitry according to claim 1, further comprising a resistive element disposed between a source connection of the first switch and the reference potential.

* * * * *